(12) United States Patent
Harada et al.

(10) Patent No.: US 6,923,041 B2
(45) Date of Patent: Aug. 2, 2005

(54) NON-RESONANCE TYPE KNOCK SENSOR

(75) Inventors: Sadamitsu Harada, Gifu (JP); Katsuki Aoi, Aichi (JP)

(73) Assignee: NGK Spark Plug Co., Ltd., Aichi (JP)

( * ) Notice: Subject to any disclaimer, the term of this patent is extended or adjusted under 35 U.S.C. 154(b) by 19 days.

(21) Appl. No.: 10/318,011

(22) Filed: Dec. 13, 2002

(65) Prior Publication Data

US 2003/0121312 A1 Jul. 3, 2003

(30) Foreign Application Priority Data

Dec. 28, 2001 (JP) ........................................ 2001-400579

(51) Int. Cl.[7] ............................................. G01L 23/22
(52) U.S. Cl. ...................................................... 73/35.07
(58) Field of Search ........................... 73/35.11, 35.13, 73/35.03, 35.07, 654, 35.09; 123/406.16, 406.4; 310/329, 321

(56) References Cited

U.S. PATENT DOCUMENTS

| | | | | |
|---|---|---|---|---|
| 4,319,480 A | * | 3/1982 | Yamaguchi et al. | 73/35.03 |
| 4,483,179 A | * | 11/1984 | Oshima et al. | 73/35.13 |
| 4,574,616 A | * | 3/1986 | Miura et al. | 73/35.11 |
| 4,964,294 A | * | 10/1990 | Kawajiri et al. | 73/35.11 |
| 4,966,031 A | * | 10/1990 | Mochizuki | 73/35.11 |
| 5,965,804 A | * | 10/1999 | Sakamoto | 73/35.11 |
| 6,220,078 B1 | * | 4/2001 | Brammer et al. | 73/35.11 |

FOREIGN PATENT DOCUMENTS

JP         2000-39357         2/2000

* cited by examiner

*Primary Examiner*—Max Noori
*Assistant Examiner*—Octavia Davis
(74) *Attorney, Agent, or Firm*—Sughrue Mion, PLLC

(57) ABSTRACT

A non-resonance type knock sensor is provided which comprises a support member having a main body portion in the form of a hollow post and a radially outward flange portion at an axial end of the main body portion, the main body portion having an abutment at an outer circumferential periphery thereof, a piezoelectric element having a hole through which the main body portion extends and placed on the flange portion, a weight having a hole through which the main body portion extends and placed on the piezoelectric element, and an elastic device disposed between the abutment and the weight to produce an elastic force for pressing the weight and the piezoelectric element against the flange portion and thereby fixing the weight and the piezoelectric element to the support member.

27 Claims, 8 Drawing Sheets

NON-RESONANCE TYPE KNOCK SENSOR

BACKGROUND OF THE INVENTION

The present invention relates to a non-resonance type knock sensor for detecting knocks or vibrations caused in an internal combustion engine by means of a piezoelectric element that is held in a compressed state inside a housing.

There have been developed various knock sensors that are attached to internal combustion engines. One of them is a non-resonance type knock sensor that detects knocks caused in the internal combustion engine by means of a piezoelectric element held in a compressed state inside a housing and supplies a detection signal to the outside.

Generally, the non-resonance type knock sensor has a support member including a main body portion formed with a hole through which a bolt extends and a radially outward flange portion at one axial end of the main body portion. On the flange portion is placed a piezoelectric element and a weight in this order. The piezoelectric element and weight have holes through which the main body portion extends. Further, between the flange portion and the piezoelectric element is disposed an output terminal for supplying a detection signal produced by the piezoelectric element to the outside. In the meantime, in case the support member and the weight are formed of a conductor such as metal, insulation members are disposed on the outer circumferential periphery of the main body portion and the flange portion which the piezoelectric element and the output terminal are brought into contact with and between the weight and the output terminal, thereby preventing the flow of the detection current produced at the piezoelectric element to the support member and the weight.

Herein, the main body portion has at an outer circumferential section located above the weight a male thread section. The piezoelectric element and the weight are fixed together with the output terminal to the support member, in a state of being pressed with a predetermined force toward the flange portion by means of a washer and a nut. All of the constituent parts are encased in a housing made of a resinous material and thereby protected from an impact or the like force applied thereto from the outside.

The non-resonance type knock sensor structured as above is attached to a cylinder head of an internal combustion engine by means of a bolt extending through the hole formed in the main body portion of the support member. By this, the weight and the piezoelectric element constituting the non-resonance type knock sensor are caused to vibrate together with the internal combustion engine. As a result, a detection signal of the same waveform as that of vibrations caused in the internal combustion engine is supplied from the output terminal to the outside.

In the meantime, the detection signal is supplied from the output terminal through, for example, a band-pass filter that limits the frequencies of vibrations caused in the internal combustion engine to those within a passed frequency band, to an ECU (Engine Control Unit) where it is determined whether knocks are caused.

SUMMARY OF THE INVENTION

In the meantime, if the nut for fixing the piezoelectric element and the weight in the above-described non-resonance type knock sensor is not tightened sufficiently but loose or the nut is in a state of being in partial contact with the washer and therefore in a loosely tightened state, the constituent parts such as the weight and the piezoelectric element are not caused to vibrate together with the internal combustion engine but unnecessary vibrations of the constituent parts that are different from those of the internal combustion engine are caused. Thus, the detection signal is added with a signal component resulting from the unnecessary vibrations, thus causing a possibility that accurate detection of vibrations caused in the internal combustion engine cannot be obtained. Particularly, if the unnecessary signal component represents frequencies adjacent the frequencies of knocks, there is a possibility that the ECU erroneously determines that knocks have been caused.

On the other hand, when the nut for fixing the piezoelectric element and the weight is tightened excessively, there is caused a possibility that the piezoelectric element is damaged by a pushing force of the nut.

In this manner, the conventional non-resonance type knock sensor encounters a problem that its installation requires much time and labor since at the time of installation it is necessitated to control the tightening torque of the nut and care must be taken with respect to the perpendicularity of the nut (the insertion angle of the nut).

It is accordingly an object of the present invention to provide a non-resonance type knock sensor that can solve the above noted problems inherent in the prior art device.

It is a further object of the present invention to provide a knock sensor of the foregoing character that can fix its constituent parts with a suitable pushing force and that can be assembled with ease.

To accomplish the above objects, the present invention provides a non-resonance type knock sensor comprising a support member having a main body portion in the form of a hollow post and a radially outward flange portion at an axial end of the main body portion, the main body portion having an abutment at an outer circumferential periphery thereof, a piezoelectric element having a hole through which the main body portion extends and placed on the flange portion, a weight having a hole through which the main body portion extends and placed on the piezoelectric element, and an elastic device disposed between the abutment and the weight to produce an elastic force for pressing the weight and the piezoelectric element against the flange portion and thereby fixing the weight and the piezoelectric element to the support member.

DESCRIPTION OF THE PREFERRED EMBODIMENTS (First Embodiment)

Figure 1:
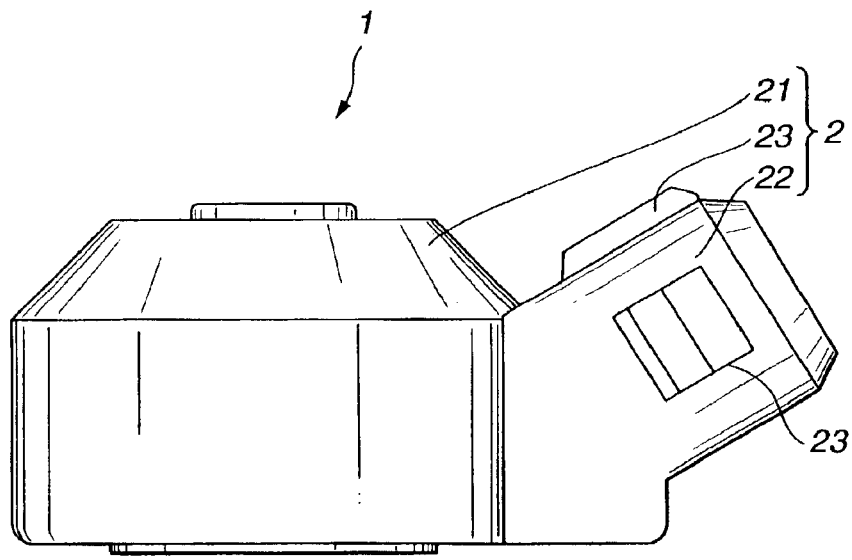
FIG. 1 is an elevational view of a knock sensor according to a first embodiment of the present invention.

Referring first to FIG. 1, a non-resonance type knock sensor according to a first embodiment of the present invention (hereinafter referred to simply as knock sensor) is generally indicated by 1 and includes a housing 2 made of a synthetic resinous material such as nylon 66. The housing 1 has a receptacle portion 21 that is generally hollow cylindrical and receives therewithin a piezoelectric element, etc. The receptacle portion 21 has an upper end section whose outer circumferential periphery is tapered. The housing 1 further has a connector portion 22 that protrudes outward from the outer circumferential periphery of the receptacle portion 21 for connecting a connector (not shown) of an ignition timing control system to the knock sensor 1. The housing 2 covers all the constituent parts of the knock sensor 1. In the meantime, the connector portion 22 has at the outer periphery a projection 23 for fittingly attaching thereto the connector.

Figure 2:
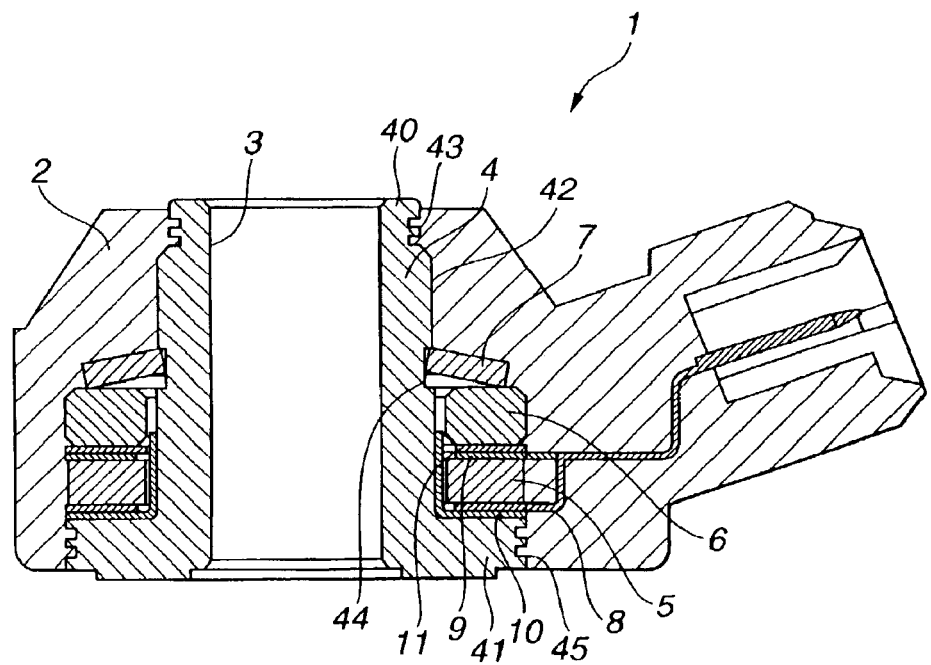
FIG. 2 is a sectional view of the knock sensor of FIG. 1.
Figure 3:
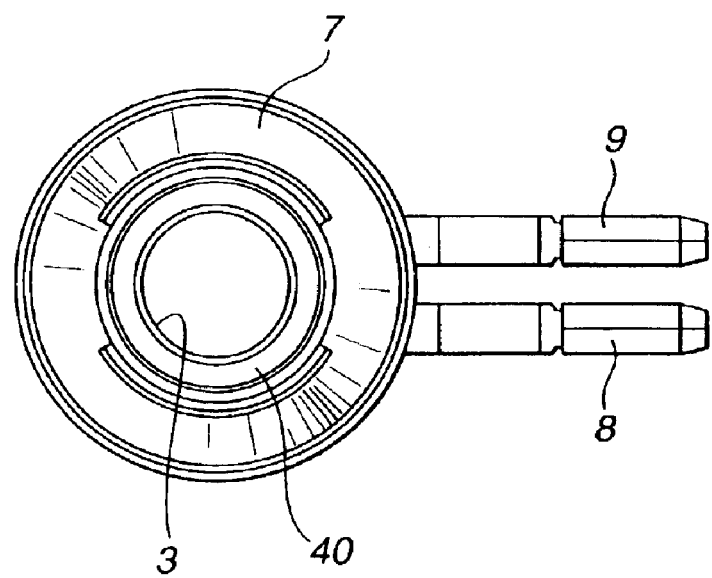
FIG. 3 is a plan view of the knock sensor of FIG. 1, with a housing being removed.

Referring to FIGS. 2 and 3, the knock sensor 1 includes a support member 4 made of metal (e.g., SWCH35K according to JIS). The support member 4 has a main body portion 40 that is generally hollow cylindrical or tubular, i.e., in the form of a hollow post to have a central hole 3 into which a bolt (not shown) is inserted and a flange portion 41 extending radially outward from an axial end (i.e., lower end in the drawing) of the main body portion 40. The support member 4 has engagement teeth 43 at an upper end outer circumferential section of the main body portion 40 and engagement teeth 45 at an outer circumferential periphery of the flange portion 41 for attaining assured locking engagement with the housing 2. Further, the main body portion 40 has at a central part of an outer circumferential periphery 42 thereof an annular lock groove 44 extending around the central part.

On the flange portion 41 of the support member 4 are placed a piezoelectric element 5 and a cylindrical weight or mass 6 in this order. The piezoelectric element 5 and weight 6 have central holes through which the main body portion 40 extends. The mass 6 is made of metal (e.g., SGD3 according to JIS) of such a specific gravity that enables the mass 6 to serve as a weight.

In the meantime, between the flange portion 41 and the piezoelectric element 5 and between the weight 6 and the piezoelectric element 5 are disposed output terminals 8, 9 that are made of an electrically conducting material (e.g., brass), respectively. However, between the flange portion 41 and the output terminal 8 and between the output terminal 9 and the weight 6 are respectively disposed insulation members 10, 11 that are formed of insulating film of a synthetic resinous material (e.g., PET) so that a short circuit is not caused between the output terminal and the support member 4 or the weight 6.

Further, the support member 4 is made of metal (e.g., S65C according to JIS) and has attached thereto a flat spring or toothed spring 7 that is lockingly engaged in the lock groove 44 for urging the weight 6 toward the flange portion 41. By this flat spring 7, the piezoelectric element 5 and the weight 6 are fixedly supported on the support member 4 together with the output terminals 8, 9 and the insulating members 10, 11.

Figure 4:
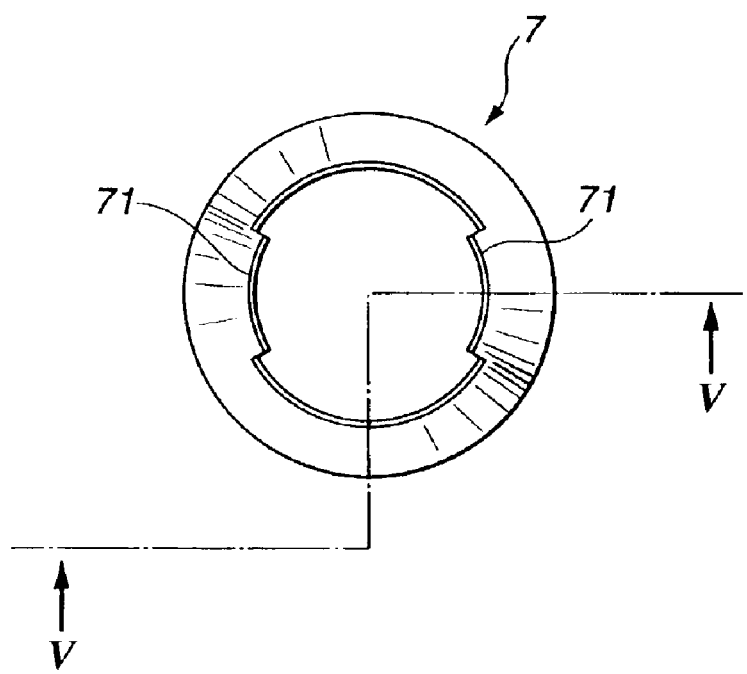
FIG. 4 is a plan view of a flat spring or toothed spring utilized in the knock sensor of FIG. 1.

As shown in FIG. 4, the flat spring 7 is in the form of a frustoconical ring or a ring-shaped plate and has a central opening for allowing the main body portion 40 to extend therethrough. The flat spring 7 has at an inner circumferential periphery a pair of teeth 71 that are disposed diametrically to each other and lockingly engaged in the lock groove 44.

In the meantime, the inner diameter of the central hole of the flat spring 7 is smaller at the portion where the teeth 71 are provided than the outer diameter of a part of the main body portion 40 that extends from the upper end to the lock groove 44 (hereinafter referred to as a main body portion upper part) and larger than the bottom diameter of the lock groove 44. The inner diameter of the remaining portion of the central hole excluding the portion where the teeth 71 are provided is larger than the outer diameter of the main body portion upper part. Namely, the flat spring 7 is brought into contact with the outer circumferential periphery 42 only at the teeth 71 and spaced from the same at the remaining portion.

Figure 5:
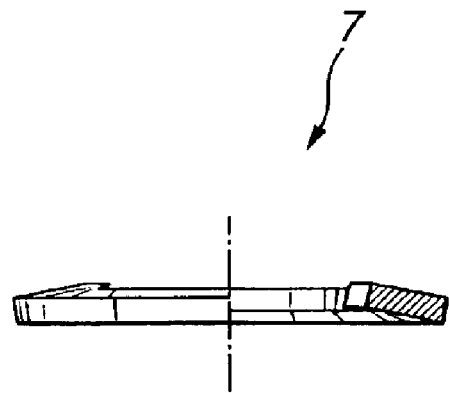
FIG. 5 is a sectional view taken along the line V—V of FIG. 4.

Further, the flat spring 7, as shown in FIG. 5, is shaped so as to taper toward the inner circumferential edge and generate a spring force in the thickness direction. However, the thickness of a sheet material forming the flat spring 7 and the height in the thickness direction (spring height) of the flat spring 7 are determined so as to provide the flat spring 7 with such a rigidity that can prevent the flat spring 7 from being elastically deformed when vibrations of the internal combustion engine cause the weight 6 and the piezoelectric element 5 to vibrate and allow a compressive force to be applied from those components to the flat spring 7.

The knock sensor 1 structured as above is installed, similarly to the conventional device, on an internal combustion engine by means of a bolt that extends through the central hole of the main body portion 40 of the support member 4 and used similarly to the conventional device.

Herein, assembly of the knock sensor 1 will be described.

Firstly, the main body portion 40 is inserted into the central hole of the piezoelectric element 5 and then into the central hole of weight 6, thereby disposing the piezoelectric element 5 on the flange portion 41 and the weight 6 on the piezoelectric element 5. Together with this, the output terminals 8, 9 and the insulating members 10, 11 are disposed in the above-described predetermined positions.

Then, the flat spring 7 is fitted on the main body portion 40 and moved into the place where the lock groove 44 is provided. Thereupon, the flat spring 7 is lockingly engaged at the teeth 71 provided to the inner circumferential edge with the lock groove 44 while being abuttingly engaged at the outer circumferential edge with the weight 6.

By this, the respective constituent parts (i.e., the piezoelectric element 5, weight 6, output terminals 8, 9 and insulating members 10, 11) are held in a state of being pressed against the flange portion 41 by means of the flat spring 7 and thereby fixed to the support member 4 (refer to FIGS. 2 and 3). Since the lock groove 44 is formed in parallel with the upper surface of the weight 6, the flat spring 7 is never brought into partial contact with the weight 6 but applies a suitable pushing force to the constituent parts uniformly.

As having been described above, by the knock sensor 1 according to this embodiment, the constituent parts can be fixed to the support member 4 only by force-fitting the flat spring 7 onto the main body portion 40 and furthermore a suitable pushing force can be applied to the constituent parts uniformly. Namely, by comparison with the conventional device in which the constituent parts are fixed by using a nut, not only the number of constituent parts and the process steps for assembly work can be reduced but the assembly can be attained with ease since it is not necessitated to take care so that partial contact of the flat spring 7 is not caused and further it is not necessitated to control the pushing force exerted by the flat spring 7.

Further, by using such a flat spring 7, it becomes possible to prevent unnecessary vibrations of the constituent parts due to the lack of pushing force applied to all of or part of the constituent parts (i.e., vibrations different from those of the internal combustion engine) assuredly. As a result, erroneous detection based on the unnecessary vibrations can be prevented and the reliability of the knock sensor 1 can be improved.

Furthermore, the pushing force applied to the weight 6 and the piezoelectric element 5 can be controlled with ease by controlling the thickness and height of the flat spring 7, and therefore an optimal pushing force according to use, etc. can be attained with ease.

Figure 6:
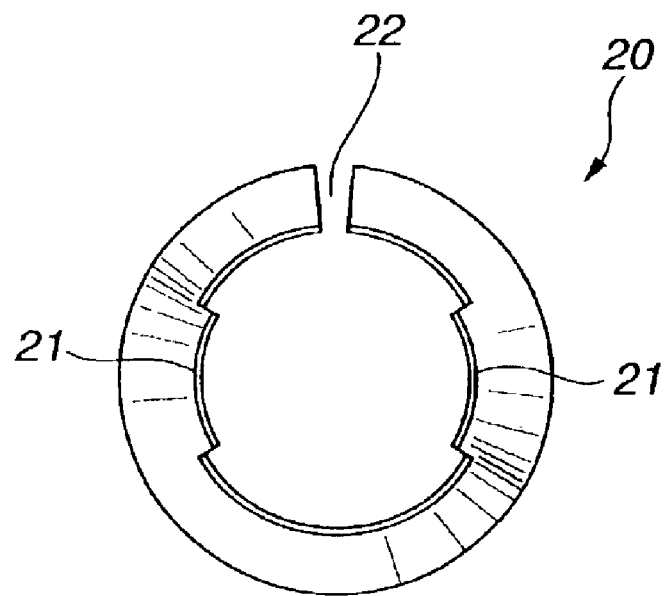
FIG. 6 is a plan view of a modification of the spring of FIG. 4.

In the meantime, in the knock sensor 1 of this embodiment, a flat spring 20 shown in FIG. 6 can be used in place of the above-described flat spring 7.

The flat spring 20 is formed with a radial cut 22 extending from the inner circumferential edge to the outer circumferential edge so as to be circumferentially separated at the cut 22. In use of this flat spring 20, when toothed portions 21 are brought into contact with the outer circumferential periphery 42 of the main body portion 40 for insertion of the main body portion 40 into the central hole of the flat spring 20, the flat spring 20 is elastically deformed so as to make larger the cut 22 and increase the area of the center hole, i.e., expand radially outward. Accordingly, it becomes possible to decrease the force necessitated for force-fitting the flat spring 20 onto the main body portion 40 and thereby prevent possible damage of the piezoelectric element 5 at the time of force-fitting of the flat spring 20.

Figure 7:
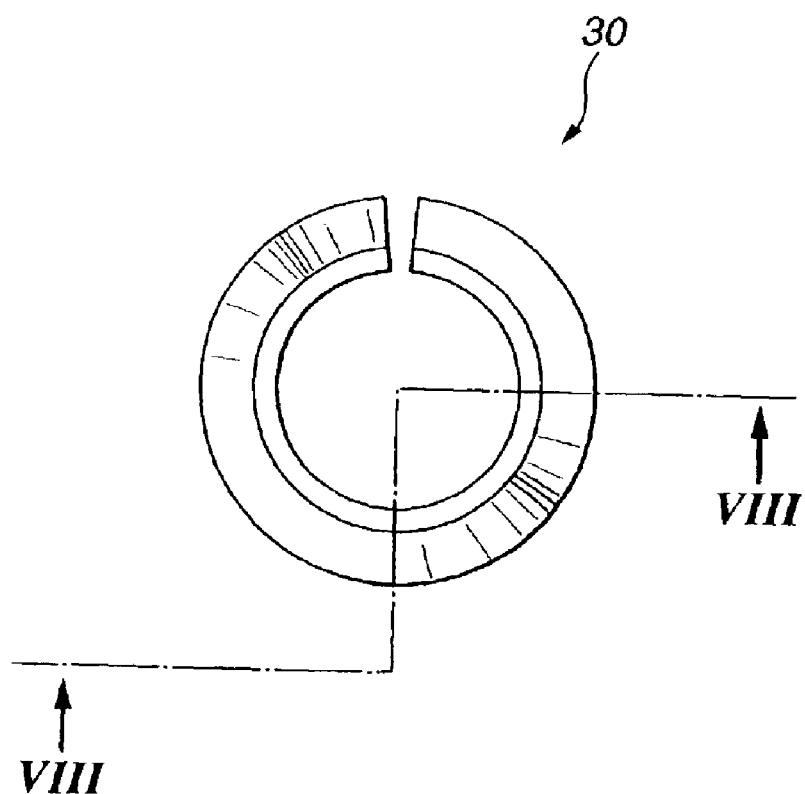
FIG. 7 is a plan view of a further modification of the spring of FIG. 4.
Figure 8:
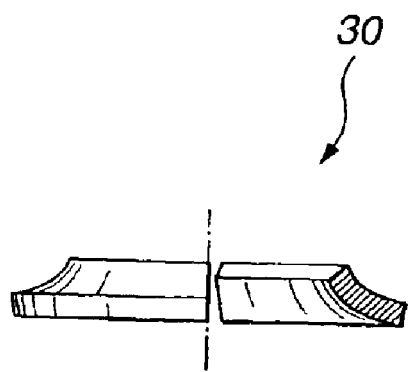
FIG. 8 is a sectional view taken along the line VIII—VIII of FIG. 7.

Further, in the knock sensor 1 of this embodiment, a flat spring 30 shown in FIGS. 7 and 8 can be used in place of the above-described flat spring 7.

The flat spring 30 has a cut extending from the inner circumferential edge to the outer circumferential edge and is shaped so as to engage at the entire inner circumferential edge in the lock groove 44 of the main body portion 40. Further, the flat spring 30 is designed so as to larger in height than the flat spring 7.

Accordingly, if the flat spring 30 is made of the same material as the flat spring 7, it is engaged with the support member 4 more firmly and can fix the constituent parts to the support member 4 with a larger pushing force than the flat spring 7. In other words, the flat spring 30 can produce a similar effect even if it is made of a softer material than the flat spring 7.

Figure 9:
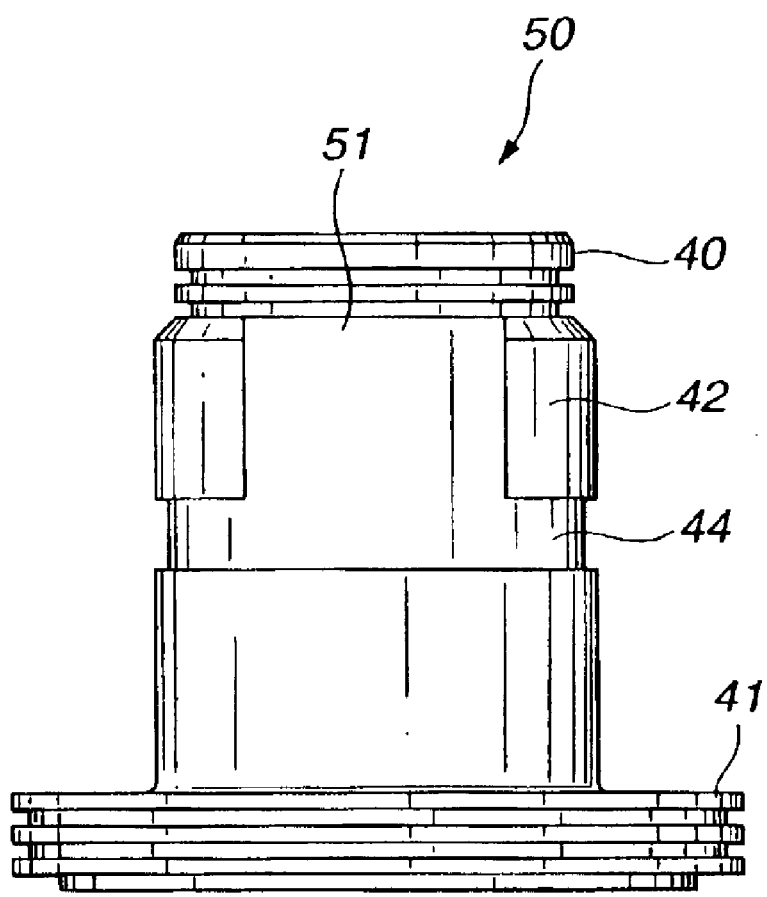
FIG. 9 is an elevational view of a support member utilized in the knock sensor of FIG. 1.

Further, in the knock sensor 1 of this embodiment, a support member 50 shown in FIG. 9 can be used in place of the support member 4. In FIG. 9, like portions to those of FIG. 2 are designated by reference numerals.

The support member 50 has at the outer circumferential wall a pair of circumferential guide grooves 51 that extend axially from the lock groove 44 toward the upper end. The guide grooves 51 are disposed diametrically opposite to each other. The circumferential length of the guide grooves 51 is set larger than that of the teeth 71 of the flat spring 7.

In assembly of the knock sensor 1, all of the constituent parts are placed on the flange portion 41 of the support member 50 and then the flat spring 7 is fitted on the main body portion 40 with the teeth 71 being engaged in the respective guide grooves 51. When the flat spring 7 reaches the lock groove 44, it is turned 90 degrees in parallel to the lock groove 44 so as to bring the teeth 71 in engagement with a circumferential surface of the lock groove 44.

By the support member 50, upon installation of the flat spring 7 onto the support member 50, the flat spring 7 can be guided smoothly to the lock groove 44 without causing the teeth 71 of the flat spring 7 to be brought into contact with the outer circumferential periphery 42. Thus, it is not necessary to force fit the flat spring 7 on the support member 50 so that the former can be attached to the latter with ease.

(Second Embodiment)

A second embodiment will be described with reference to FIGS. 10 to 13 in which like parts and portions to those of the first embodiment will be designated by like reference characters.

Figure 10:
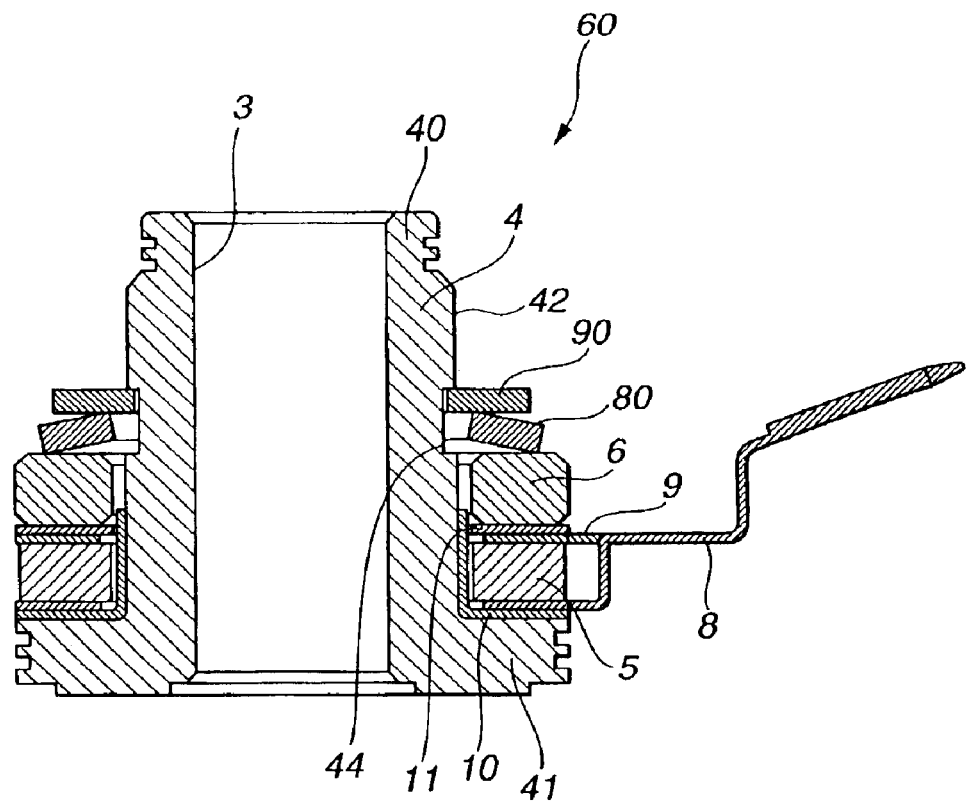
FIG. 10 is a sectional view of a knock sensor according to a second embodiment, with a housing being omitted.
Figure 11:
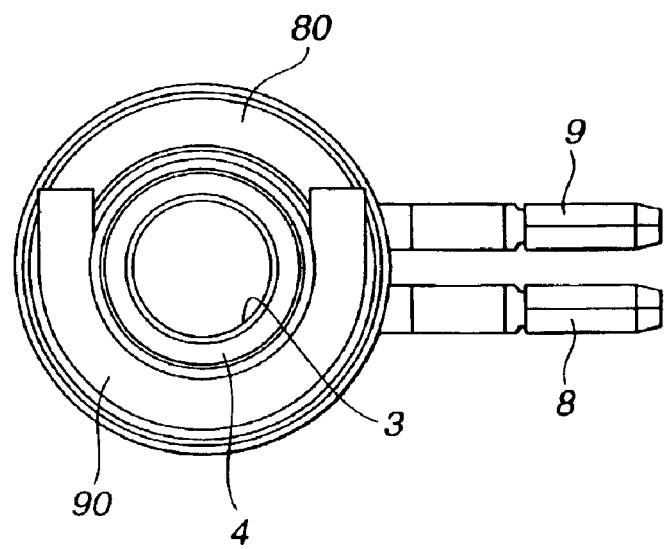
FIG. 11 is a plan view of the knock sensor of FIG. 10, with the housing being omitted.

As shown in FIGS. 10 and 11, in the knock sensor 60 of this embodiment, the flat spring 7 of the first embodiment is replaced by a ring-shaped flat spring 80 made of metal (e.g., S65C according to JIS) and a U-shaped lock plate 90 made of metal (e.g., S65C according to JIS). The flat spring 80 placed on the weight 6 is lockingly engaged in the lock groove 44 by way of the lock plate 90.

Figure 12:
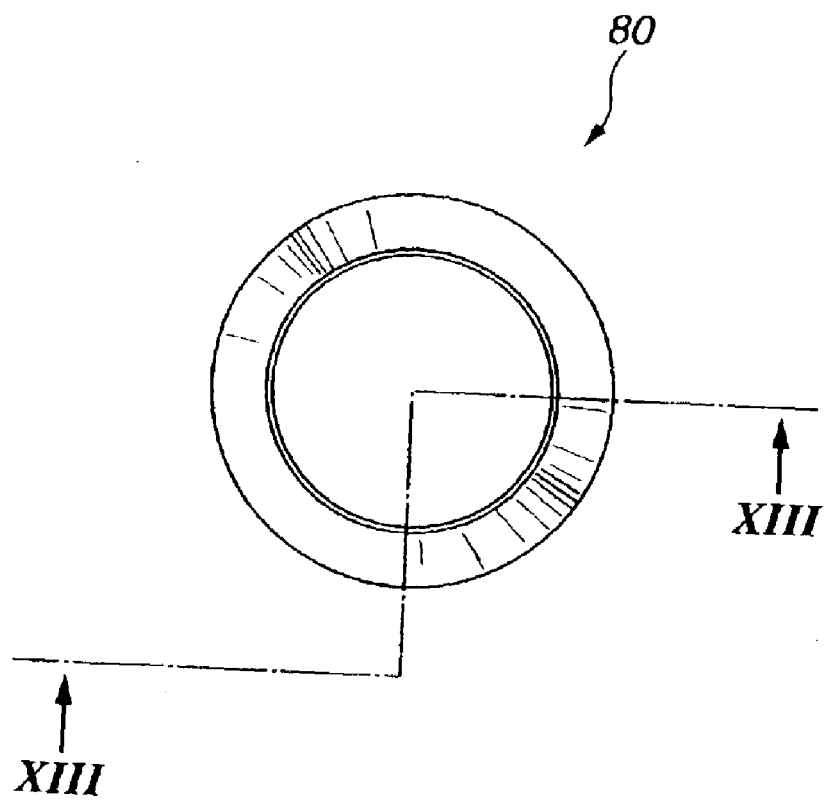
FIG. 12 is a plan view of a flat spring or Belleville spring utilized in the knock sensor of FIG. 10.

As shown in FIGS. 12, the flat spring 80 is formed of a ring-shaped flat plate so as to have a central hole through which the main body portion 40 extends. In the meantime, the diameter of the central hole is larger than that of the outer circumferential periphery 42 of the main body portion 40 so that a space is formed between the outer circumferential periphery 42 and the inner circumferential periphery of the flat spring 80 when the main body portion 40 is inserted into the central hole of the flat spring 80.

Figure 13:
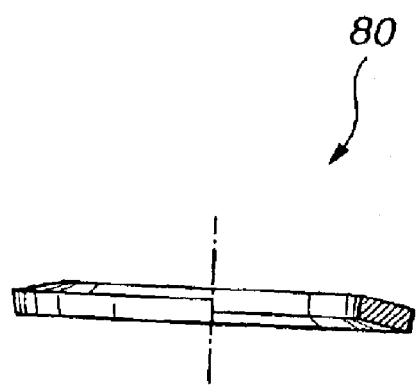
FIG. 13 is a sectional view taken along the line XIII—XIII of FIG. 12.

As shown in FIG. 13, the flat spring 80 has an annular wall that is inclined so as to taper toward the inner circumferential edge and is adapted to produce an elastic force in thickness or height direction. However, the thickness of a sheet material forming the flat spring 80 and the height of the same are determined so as provide the flat spring 80 with such a rigidity that prevents the flat spring 80 from being elastically deformed when vibrations of the internal combustion engine cause the weight 6 and the piezoelectric element 5 to vibrate and allow a compressive force to be applied from those constituent parts to the flat spring 80.

Figure 14:
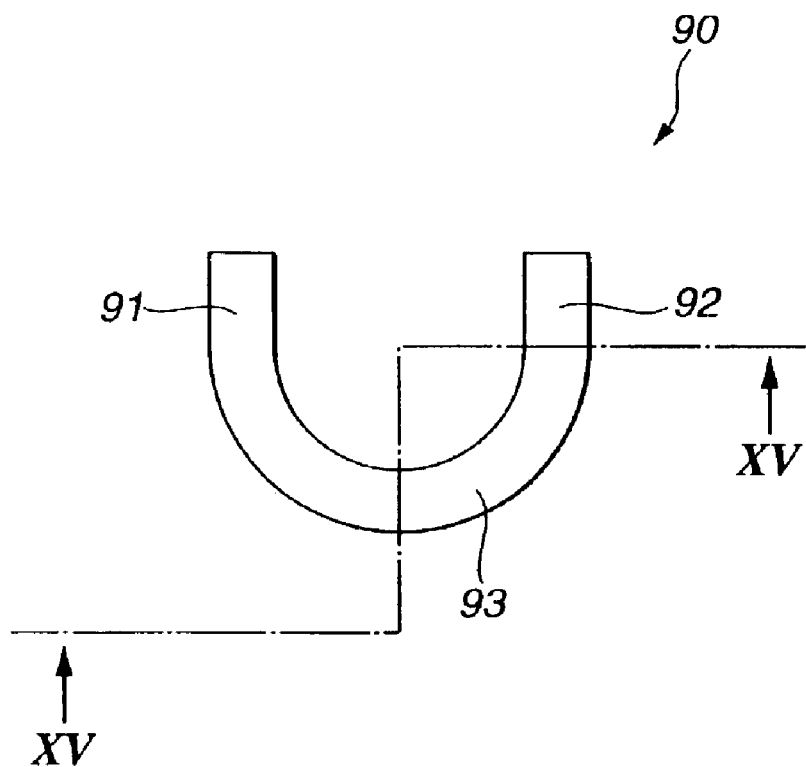
FIG. 14 is a plan view of a lock member utilized in the knock sensor of FIG. 9.
Figure 15:
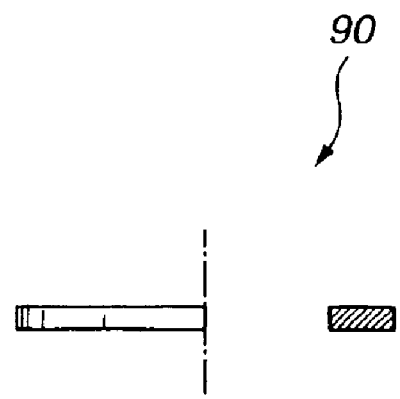
FIG. 15 is a sectional view taken along the line XV—XV of FIG. 14.

As shown in FIG. 14, the lock plate 90 includes a pair of arm portions 91, 92 lockingly engaged in the lock groove 44 and a connecting portion 93 connecting between the arm portions 91, 92 and lockingly engaged in the lock groove 44 while surrounding the main body portion 40 by half turn. As shown in FIG. 15, the lock plate 90 is in the form of a flat plate of uniform thickness. However, the thickness of the lock plate 90 is determined so that the sum of the free height of the flat spring 80 and the thickness of the lock plate 90 is larger than the distance between the upper surface of the weight 6 and an upper radial surface of the lock groove 44. In this connection, the lock groove 44 is defined by the upper radial surface, a lower radial surface and a circumferential surface between the upper and lower radial surfaces.

Assembly of the knock sensor 60 will be described.

First, similarly to the knock sensor 1 of the first embodiment, the piezoelectric element 5 and the weight 6 are placed on the flange portion 41 together with the output terminals 8, 9 and the insulating members 10, 11. Then, the flat spring 80 is placed on the weight 6 in such a manner as to allow the outer circumferential edge to contact the weight 6. The lock plate 90 is inserted into the space between the upper radial surface of the lock groove 44 and the flat spring 80 and moved perpendicularly to the outer circumferential periphery 42.

By this, the flat spring 80 is lockingly engaged in the lock groove 44 by way of the lock plate 90 while applying to the constituent parts a pushing force toward the flange portion 41 thereby fixing the constituent parts to the support member 4.

By the knock sensor 60 of this embodiment, insertion of the main body portion 40 into the flat spring 80 does not require the central hole circumferential surface of the flat spring 80 to contact the outer circumferential periphery 42, so that the flat spring 80 can be installed with ease without the necessity of being force-fitted onto the main body portion 40 of the support member 4.

In the foregoing, it is to be understood that the flat spring 80 and the lock plate 90 constitute an elastic device for elastically supporting the piezoelectric element 5 and the weight 6 on the support member 4. The flat spring 80 constitutes an elastic member of the elastic device, and the lock plate 90 constitutes a lock member of the elastic device. In this connection, the flat spring 7 in the first embodiment is considered as constituting an elastic device that includes a lock member constituted by the teeth 71 and an elastic member constituted by the remaining portion of the flat spring 7.

The entire contents of Japanese Patent Application P2001-400579 are incorporated herein by reference.

Although the invention has been described above by reference to certain embodiments of the invention, the invention is not limited to the embodiments described above. Modifications and variations of the embodiments described above will occur to those skilled in the art, in light of the above teachings. For example, while in the above-described embodiments the flat spring is adapted to engage in the lock groove, the lock groove can be replaced by an abutment such as a pair of part-circular depressions in which the teeth of the flat spring are lockingly engaged. Further, the main body portion of the support member can have at the outer circumferential periphery a further modified abutment such as a pair of projections with which the teeth of the flat spring are lockingly engaged. The scope of the invention is defined with reference to the following claims.

What is claimed is:

1. A non-resonance type knock sensor comprising:
   a support member having a main body portion in the form of a hollow post and a radially outward flange portion at an axial end of the main body portion, the main body portion having an abutment at an outer circumferential periphery thereof;
   a piezoelectric element having a hole through which the main body portion extends and placed on the flange portion;
   a weight having a hole through which the main body portion extends and placed on the piezoelectric element; and
   an elastic device disposed between the abutment and the weight to produce an elastic force for pressing the weight and the piezoelectric element against the flange portion and thereby fixing the weight and the piezoelectric element to the support member, wherein the elastic device comprises a pair of teeth protruding radially inward from an inner circumferential periphery thereof.

2. A non-resonance type knock sensor according to claim 1, wherein the elastic device is shaped so as to surround the main body portion of the support member.

3. A non-resonance type knock sensor according to claim 1, wherein the elastic device comprises:
   an elastic member in the form of a frustoconical ring and having a hole through which the main body portion of the support member extends; and
   a lock member lockingly engaged with the abutment of the support member for fixedly holding the elastic member at a position where an outer circumferential edge of the elastic member is abuttingly engaged with the weight.

4. A non-resonance type knock sensor according to claim 3, wherein the elastic member comprises a flat spring.

5. A non-resonance type knock sensor according to claim 3, wherein the elastic device is lockingly engaged at its teeth with the abutment.

6. A non-resonance type knock sensor according to claim 5, wherein the elastic member has a radial cut and is circumferentially separated by the cut.

7. A non-resonance type knock sensor according to claim 5, wherein the abutment comprises an annular lock groove extending around the main body portion of the support member, and the main body portion of the support member has a guide groove for guiding the teeth of the elastic member to the lock groove.

8. A non-resonance type knock sensor according to claim 3, wherein the lock member is U-shaped and has a pair of arms lockingly engaged with the abutment, and the elastic member is lockingly engaged at the inner circumferential edge with the lock member and thereby lockingly engaged with the abutment by way of the lock member.

9. A non-resonance type knock sensor comprising:
   a support member having a tubular main body portion and a radially outward flange portion at an axial end of the main body portion, the main body portion having an abutment at an outer circumferential periphery thereof;
   an annular piezoelectric element surrounding the main body portion and placed on the flange portion; and
   an elastic device disposed between the abutment and the piezoelectric element for elastically urging the piezoelectric element toward the flange portion and thereby fixedly supporting the piezoelectric element on the support member,
   wherein the elastic device comprises a pair of teeth projecting radially inward from an inner circumferential periphery thereof.

10. A non-resonance type knock sensor according to claim 9, further comprising an annular weight surrounding the main body portion of the support member and interposed between the elastic device and the piezoelectric element.

11. A non-resonance type knock sensor according to claim 10, wherein the abutment comprises an annular lock groove extending around the main body portion of the support member.

12. A non-resonance type knock sensor according to claim 11, wherein the elastic device comprises a ring-shaped frustoconical flat spring having the pair of teeth projecting radially inward from the inner circumferential periphery thereof and disposed diametrically opposite to each other, the flat spring being lockingly engaged at the teeth in the lock groove and abuttingly engaged at an outer circumferential edge with the weight.

13. A non-resonance type knock sensor according to claim 12, wherein the flat spring has at a portion where the teeth are provided an inner diameter that is smaller than an outer diameter of the outer circumferential periphery of the main body portion of the support member and larger than a bottom diameter of the lock groove.

14. A non-resonance type knock sensor according to claim 12, wherein the flat spring has a radial cut and is circumferentially separated at the cut.

15. A non-resonance type knock sensor according to claim 12, wherein the main body portion of the support member has a guide groove for guiding the teeth of the flat spring to the lock groove.

16. A non-resonance type knock sensor according to claim 11, wherein the elastic device comprises a ring-shaped frustoconical flat spring having a radial cut and is circumferentially separated at the cut.

17. A non-resonance type knock sensor according to claim 15, wherein the flat spring has an inner diameter that is smaller than an outer diameter of the outer circumferential periphery of the main body portion of the support member and larger than a bottom diameter of the lock groove.

18. A non-resonance type knock sensor according to claim 11, wherein the elastic device comprises:
a ring-shaped frustoconical spring surrounding the main body portion of the support member; and
a lock plate lockingly engaged with the lock groove of the support member for fixedly holding the spring at a position where an outer circumferential edge of the spring is abuttingly engaged with the weight.

19. A non-resonance type knock sensor according to claim 18, wherein the lock plate is U-shaped and has a pair of arms lockingly engaged with the lock groove, and the spring is lockingly engaged at the inner circumferential edge with the lock plate and thereby lockingly engaged with the lock groove by way of the lock plate.

20. A non-resonance type knock sensor according to claim 19, wherein the flat spring has an inner diameter that is larger than an outer diameter of the outer circumferential periphery of the main body portion of the support member.

21. A non-resonance type knock sensor comprising:
a support member having a main body portion in the form of a hollow post and a radially outward flange portion at an axial end of the main body portion, the main body portion having a groove that forms an abutment at an outer circumferential periphery thereof;
a piezoelectric element having a hole through which the main body portion extends and placed on the flange portion;
a weight having a hole through which the main body portion extends and placed on the piezoelectric element;
a lock member having a top surface and a bottom surface opposite the top surface, such that the top surface is lockingly engaged with a portion of the abutment and an open space is formed between a periphery of the groove and an inner circumferential periphery of the lock member; and
an elastic device disposed between the lock member and the weight to produce an elastic force for pressing the weight and the piezoelectric element against the flange portion and thereby fixing the weight and the piezoelectric element to the support member,
wherein a thickness of the lock member from the top surface to the bottom surface is less than a width of the groove, such that the lock member fits within the groove, said width being measured in an axial direction of the support member.

22. A non-resonance type knock sensor according to claim 21, wherein the elastic device comprises:
an elastic member in the form of a frustoconical ring and having a hole through which the main body portion of the support member extends; and
the lock member is lockingly engaged with the abutment of the support member for fixedly holding the elastic member at a position where an outer circumferential edge of the elastic member is abuttingly engaged with the weight.

23. A non-resonance type knock sensor according to claim 22, wherein the elastic member comprises a pair of teeth integral with the elastic member and protruding radially inward from an inner circumferential periphery of the elastic member, the elastic device being lockingly engaged at the teeth with the abutment.

24. A non-resonance type knock sensor comprising:
a support member having a tubular main body portion and a radially outward flange portion at an axial end of the main body portion, the main body portion having a groove that forms an abutment at an outer circumferential periphery thereof;
an annular piezoelectric element surrounding the main body portion and placed on the flange portion;
a lock member having a top surface and a bottom surface opposite the top surface, such that the top surface is lockingly engaged with a portion of the abutment and an open space is formed between a periphery of the groove and an inner circumferential periphery of the lock member; and
an elastic device disposed between the lock member and the piezoelectric element for elastically urging the piezoelectric element toward the flange portion and thereby fixedly supporting the piezoelectric element on the support member,
wherein a thickness of the lock member from the top surface to the bottom surface is less than a width of the groove, such that the lock member fits within the groove, said width being measured in an axial direction of the support member.

25. A non-resonance type knock sensor according to claim 24, further comprising an annular weight surrounding the main body portion of the support member and interposed between the elastic device and the piezoelectric element.

26. A non-resonance type knock sensor according to claim 25, wherein the abutment comprises an annular lock groove extending around the main body portion of the support member.

27. A non-resonance type knock sensor according to claim 26, wherein the elastic device comprises:
a ring-shaped frustoconical spring surrounding the main body portion of the support member; and
the lock member is lockingly engaged with the lock groove of the support member for fixedly holding the spring at a position where an outer circumferential edge of the spring is abuttingly engaged with the weight.

* * * * *